United States Patent [19]

Yoshida et al.

[11] Patent Number: 4,926,487
[45] Date of Patent: May 15, 1990

[54] SPEAKER SYSTEM

[75] Inventors: Tetsuji Yoshida, Toyonaka; Yoshiaki Teraoka, Daito; Yoji Ogawa, Kobe; Ken Kozaki, Nishiyodogawa; Kenji Hara, Higashiosaka; Hiroshi Satou, Kadoma; Akira Yoshino, Daito, all of Japan

[73] Assignee: Sanyo Electric Co., Ltd., Osaka, Japan

[21] Appl. No.: 323,731

[22] Filed: Mar. 15, 1989

[30] Foreign Application Priority Data

Mar. 16, 1988 [JP] Japan .............................. 63-34640[U]
Jul. 27, 1988 [JP] Japan .............................. 63-99435[U]
Aug. 5, 1988 [JP] Japan .............................. 63-104209[U]

[51] Int. Cl.$^5$ .............................................. H04R 1/02
[52] U.S. Cl. ..................................... 381/186; 381/205
[58] Field of Search ............... 381/182, 181, 186, 205, 381/24, 154; 181/144, 163

[56] References Cited

U.S. PATENT DOCUMENTS

| | | | |
|---|---|---|---|
| 1,908,172 | 5/1933 | Nicolson | 181/163 |
| 1,988,250 | 1/1935 | Olson | 381/184 |
| 4,509,184 | 4/1985 | Yanagawa | 381/24 |

FOREIGN PATENT DOCUMENTS 58-50781 4/1983 Japan .
58-54177 4/1983 Japan .

Primary Examiner—Forester W. Isen
Attorney, Agent, or Firm—Armstrong, Nikaido, Marmelstein, Kubovcik & Murray

[57] ABSTRACT

A speaker system for reproducing heavy low sounds comprises a tube body having a tubular straight portion and a pair of tubular arms, each of the arms extending substantially in parallel to each other in the forward direction to provide therebetween a wide space opening forward for accommodation, each arm further having sound radiation outlets formed in its forward end portion. A speaker driver is attached to the forward end of one of the arms and communicating with the sound radiation outlets, and a drone cone attached to the forward end of the other of the arms and communicating with the sound radiation outlets.

5 Claims, 7 Drawing Sheets

SPEAKER SYSTEM

FIELD OF THE INVENTION

The present invention relates to a speaker system for reproducing low sounds, and more particularly, to an improved speaker system especially for heavy low sounds. The speaker system of the present invention can be integrally provided with TV cabinet.

BACKGROUND OF THE INVENTION

The low sound or low frequency was heretofore not deemed to be important in the sound reproduction of the TV receiver. With the TV receiver in recent years, however, it has been intended to create high quality sounds by emphasizing the range of low sounds, especially heavy low sounds, thereby attempting to simulate the perception at a live performance. For example, there has been developed 3D (3-dimensions) system which R and L signals in the middle and high frequency ranges during stereophonic broadcasting are reproduced through the right and left speakers for middle and high sounds, and the signals in the low frequency range are reproduced through a single speaker for low sounds.

The low frequency range generally includes the sounds having frequency in the range of 20 to 200 Hz. However, the heavy low frequency range does not have a distinct definition on its range. For example, the sounds having the frequency of up to 100 Hz, of up to 70 Hz or of up to 50 Hz or the like are generally deemed as being included in the heavy low frequency range.

Figure 9:
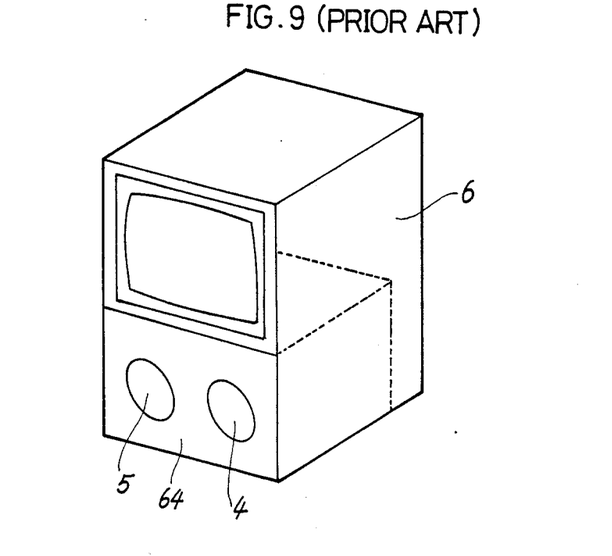
FIGS. 9 and 10 are perspective views showing the TV cabinet mounted with a conventional speaker system.

Japanese Unexamined Utility Model Publication SHO.-58-54177 discloses a TV receiver having installed therein a speaker system adapted for reproduction of the low sound. FIG. 9 shows the TV cabinet disclosed in this publication. With this TV cabinet, a cabinet 6 has a lower section having installed therein a speaker box 64 in which a heavy low sound speaker 4 and a drone cone 5 are mounted.

Figure 10:
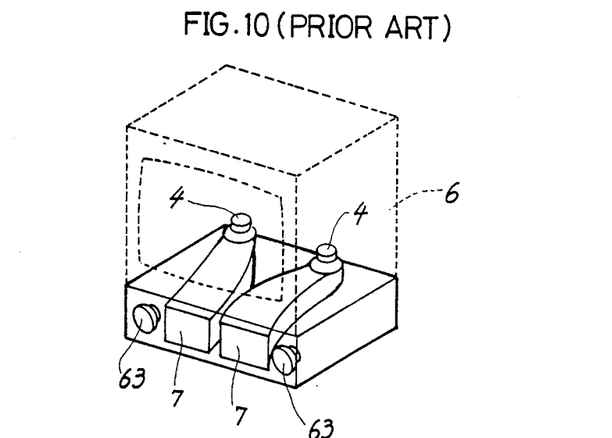

Further, Japanese Unexamined Utility Model Publication SHO.58-50781 discloses a speaker system provided at the lower portion of the television cabinet 6, as shown in FIG. 10. The speaker system comprises the driving speakers 63, 63 for middle and high sounds (mid-frequency and high frequency speaker drivers), and the driving speakers 4, 4 for low sounds (low frequency speaker driver) having connected thereto horns 7, 7.

With the foregoing speaker systems, however, it is required for reproduction of the low sounds to expand a volume of the speaker box or the horn. Therefore, there was a drawback that the entire volume of the TV receiver must be enlarged.

Figure 7A:
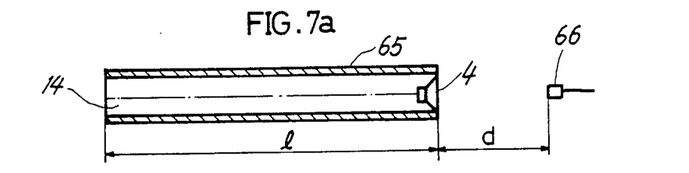
FIGS. 7a and 7b are diagrams respectively showing the experiment of a cylindrical horn and showing a waveform of frequency characteristics obtained on the experiment.
Figure 7B:
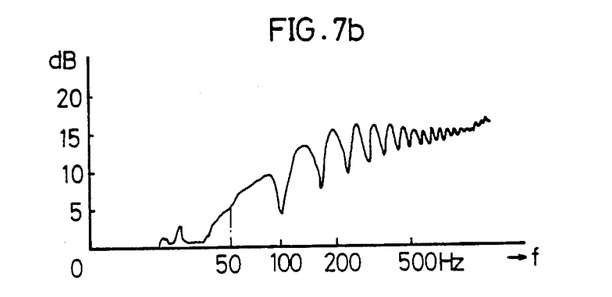

The speaker having a voice coil is provided with a speaker box or a horn so as to boost sound pressure for reproducing the low sound. This implementation is based on a kind of the columnar resonance principle. For example, with reference to FIG. 7a, a cylindrical horn 65 has one end having mounted therewith a driving speaker 4 and other end having opening. When the sound signal is applied to the driving speaker 4 and the frequency of the sound signal is varied, the microphone 66 positioned at the place away from the speaker 4 by distance "d" revealed ripple characteristics in the waveform of frequency characteristics, as shown in FIG. 7b.

The resonance frequency is given by the formula as follows:

$$\frac{(2n-1) \times C}{4l}$$

where n is a positive integer, l is a length of the cylindrical horn and C is a sound velocity.

The sound pressure received by the microphone 66 had such characteristics that the peaks of the sound pressure were generated at almost the same positions as those obtained by calculation of the resonance frequency of the cylindrical horn. This proves that the actual sound pressure characteristic agrees well with the theoretical results. Such a cylindrical horn is not suited for use in the speaker system for low sounds since the sound pressure varies depending upon the frequency of the sound signal.

Figure 8A:
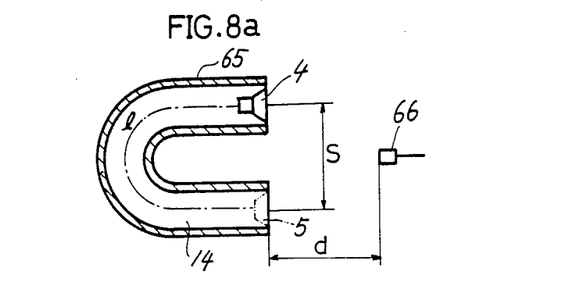
FIGS. 8a and 8b are diagrams respectively showing the experiment of a U-shaped cylindrical corn and showing a waveform of frequency characteristics obtained on the experiment.

With reference top FIG. 8a, the cylindrical horn is formed in U-shape and has other end opening toward the front. In case of this cylindrical horn, when sound signals are fed to the driving speaker 4, the sound is transmitted from both the speaker 4 and the horn opening 14 to the microphone 66 having distance "d" away from the horn. The sounds from the speaker 4 and the horn opening 14 are increased or boosted with each other when the phases of the sound are brought into coincidence at the microphone 14, but are reduced when the phases of the sound shift from each other by 180°. Therefore, the resultant waveform characteristics become complicated due to interference, as shown in FIG. 8 with a broken line.

Figure 8B:
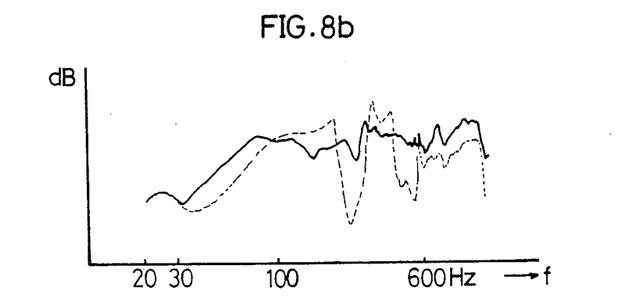

The inventors have found that when the drone cone 5 is attached to the horn opening 14 the drone cone 5 is caused to vibrate in accordance with the pressure change within the horn 65 generated by the vibration of the speaker driver 4, resulting in the frequency characteristics as shown in FIG. 8b with a solid line. Since the drone cone 5 has a vibrating plate or diaphragm but no driving coil, the diaphragm vibrates only by the vibration of air produced in the horn 65. This speaker system has a higher sound pressure in the range of 30-100 Hz, in comparison with that of the speaker system having no drone cone. Further, it has been found also in the range of 200-600 Hz that the speaker system with drone cone has more improved characteristics than the system having no drone cone.

The speaker system of the present invention has been accomplished by the foregoing recognition.

SUMMARY OF THE INVENTION

An object of the present invention is to provide a speaker system which can be installed in a small space and has an excellent performance with respect to reproduction of heavy low sound.

Another object of the present invention is to provide a speaker system which can be incorporated with a TV cabinet to reproduce a heavy low sound and yet which is not required to enlarge the size of the television receiver.

DETAILED DESCRIPTION OF THE EMBODIMENT

Figure 1:
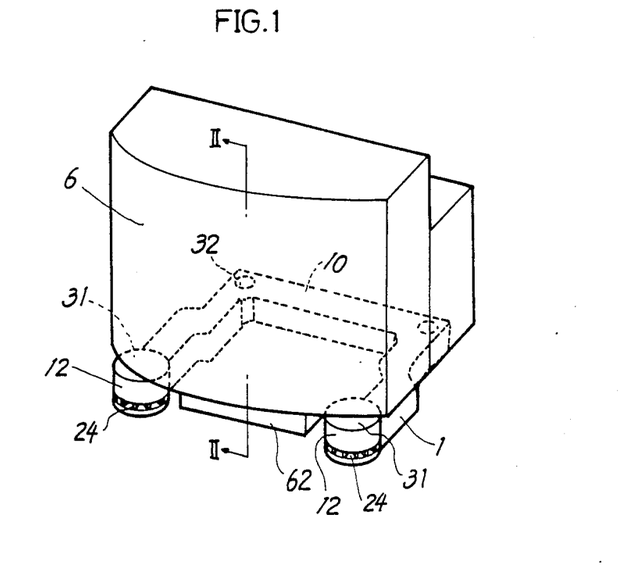
FIG. 1 is a perspective view showing a television receiver mounted with a speaker system according to the present invention.

With reference to FIG. 1, the speaker system according to the present invention is adapted to be used as a mount base of a TV cabinet and to accommodate therein a control part 62 projecting downwardly from the bottom of the TV cabinet. The speaker system is provided at its front area with sufficient open space and thus can make the TV cabinet compact.

Figure 3:
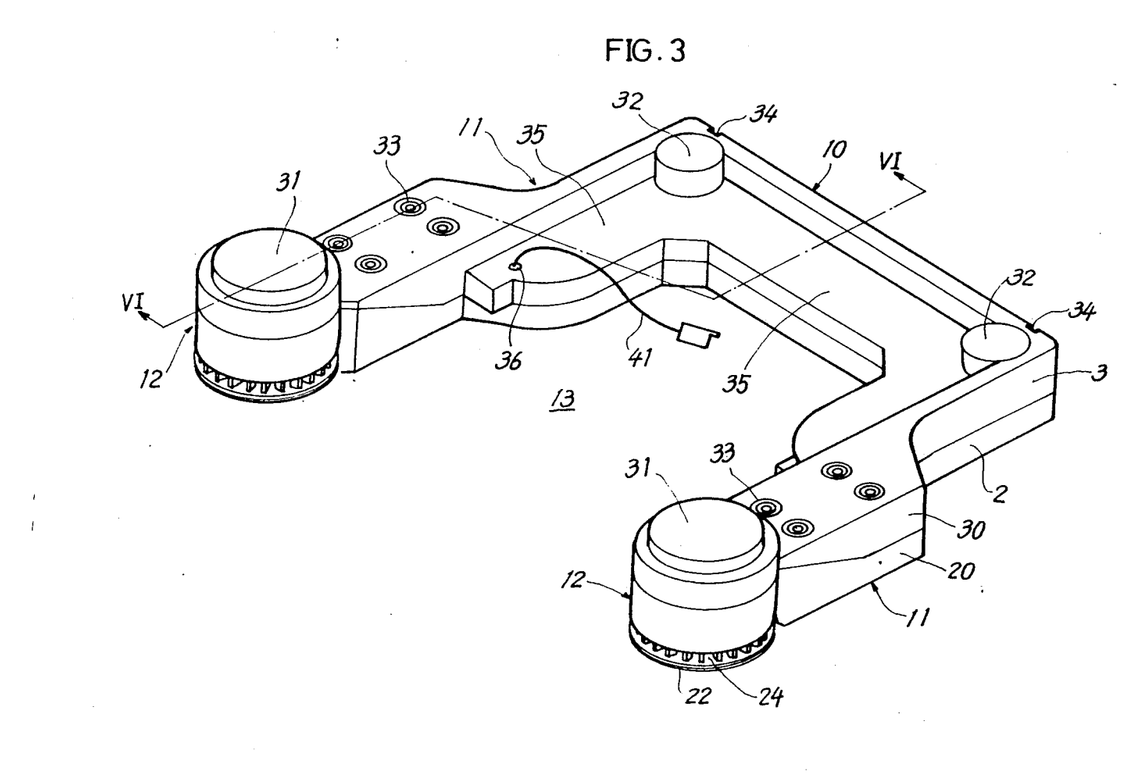
FIG. 3 is a perspective view showing the speaker system according to the present invention.
Figure 4:
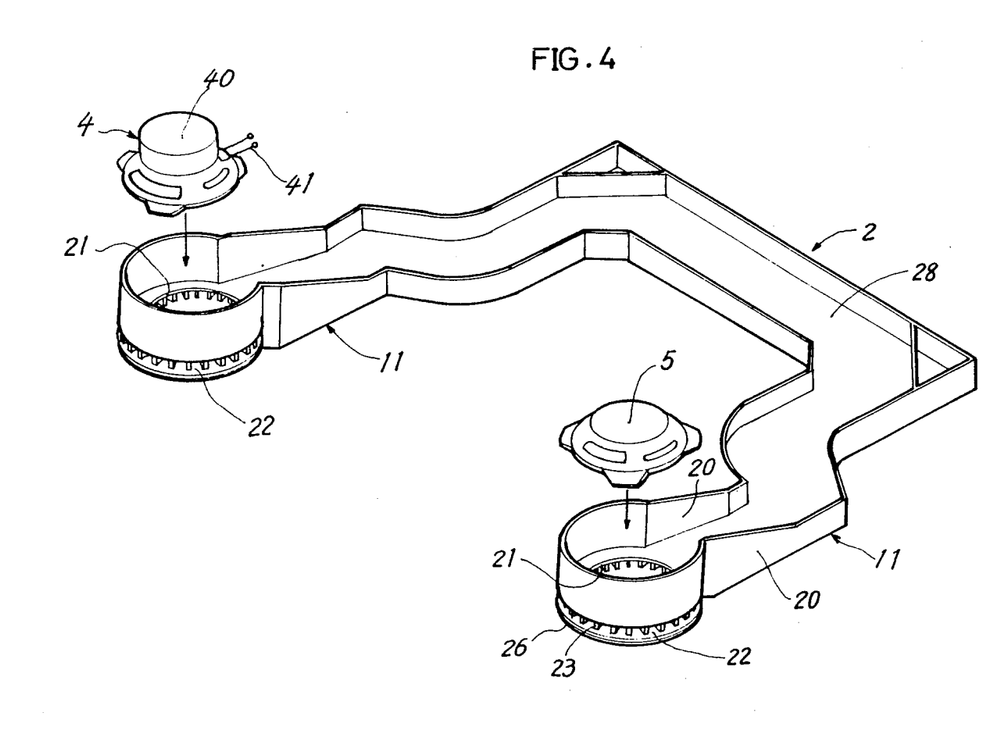
FIG. 4 is a perspective view showing the lower half of the speaker system.
Figure 5:
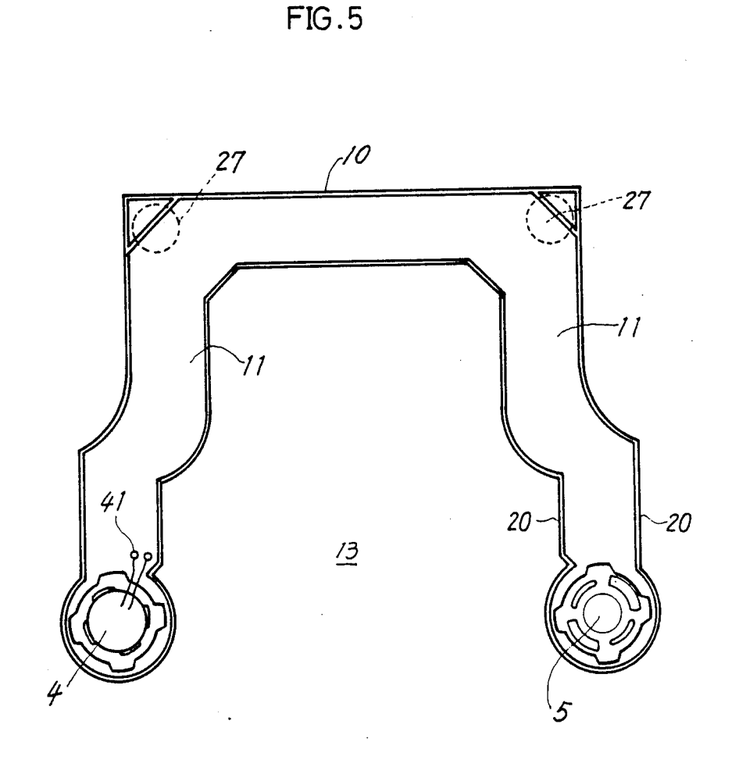
FIG. 5 is a plan view showing the lower half of the speaker system.

The present speaker system has a configuration formed by bending an elongated tube body 1 into a substantially U shape. The tube body has a straight portion 10 which is provided at both ends thereof with a pair of arms 11, 11 extending forward. The terminate portion 12 of the arm is enlarged to receive therein a speaker driver 4 and an enlarged other end 12 to receive therein a drone cone 5, each of the arm ends being formed at the inner periphery with sound radiation space 24. The entire length l measured along the center line of the space in the tube body 1 is so determined as to provide the optimum length for resonance with the heavy low sound in the speaker. As shown in FIGS. 3 and 4, the tube body 1 of the speaker system comprises a lower half body 2 and an upper half body 3, each of the half bodies being formed of synthetic resin material by injection molding and fitted with each other. The lower half body 2 has a bottom wall 28 in the shape of a U-form having the same width over its entire length and provided at both sides thereof with vertical side walls 20, 20 having the same width over its entire length. The bottom wall 28 of the arm 11 is formed at the forward end into an enlarged circle shape having a central circular opening 21. The side wall 20 extends cylindrically on the circumference of the circular bottom wall to surround the circular opening 21.

The speaker driver 4 comprises a magnetic circuit 40 and cords 41, and is fitted into one of the circular opening 21 formed in the forward end of the arm on the lower half body 2.

As well as in the above, the drone cone 5 is fitted into the circular opening 21 formed in the forward end of other arm on the lower half body 2. The forward end of the arm is disposed at the under surface thereof with a sound radiation plate 22 having a large number of vertical ribs 23 each extending radially from the position corresponding to the circumference of the circular opening 21 of the arm. Sound radiation outlets are formed between ribs 23 and 23 on the sound radiation plate 22 and communicate with the circular opening 21 of the arm. The sound radiation plate 22 has a bottom surface having a centrally heaved portion which defines a curved surface lowering gradually toward an outer ridge portion, thus emanating the sound vibration of the speaker driver 4 and the drone cone 5, respectively outward along the curved surface of the bottom portion.

The rubber-made leg plates 27 are attached to the under surface of the bottom wall 28 on the positions corresponding to the corners of the lower half body 2, and the bottom plate 26 is provided at the under surface of the sound radiation plate 22.

An upper half body 3 is formed into a substantially U-shape corresponding to the configuration of the bottom wall 28 of the lower half body 2. Side walls 30, 30 extend downward from both side edges of the upper wall 35 and opposed to the upwardly extending side walls 20, 20 of the lower half body 2. The lower and upper half bodies 2, 3 are fitted at their end surfaces of the side walls with each other.

The upper half body has mounting surfaces 31, 31 at the front end portion thereof, and further has holes 33 for inserting therethrough the fastening member such as bolts for connection to the front case 60 of the TV cabinet and a hole 36 for the cord 41 connected to the speaker driver 4.

Figure 6:
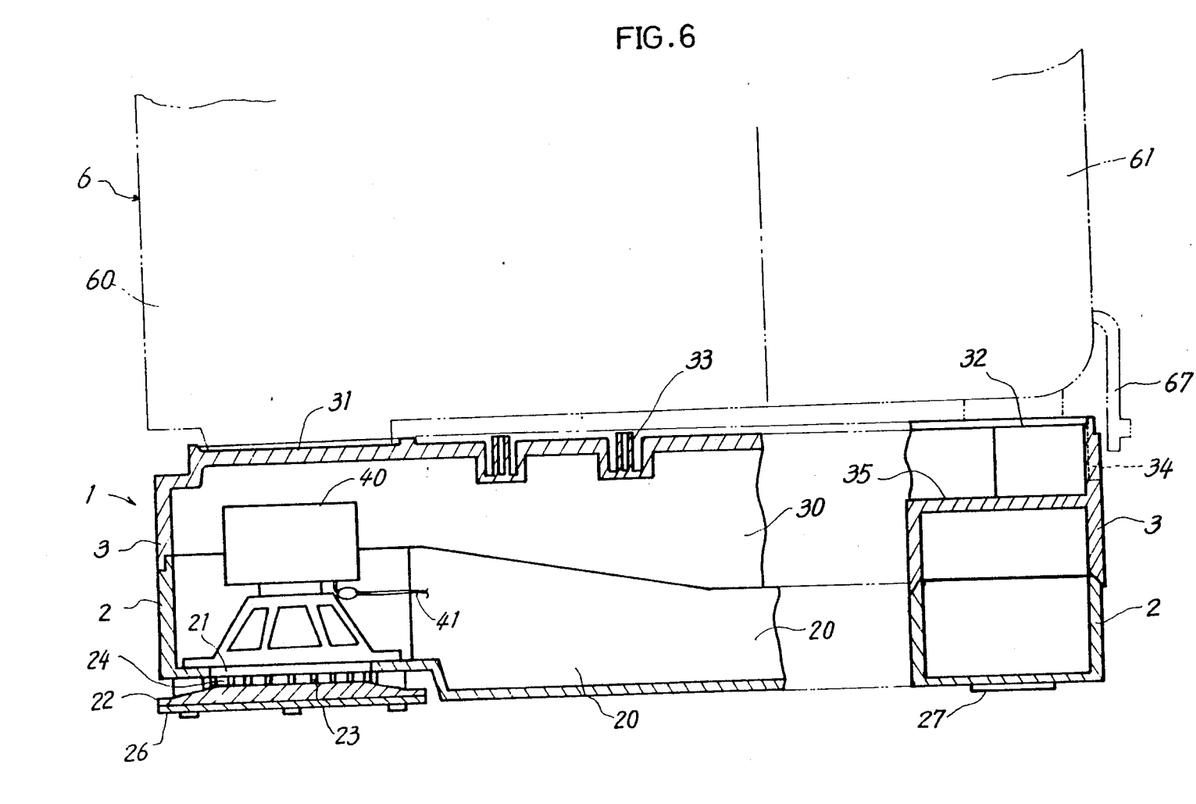
FIG. 6 is a view in section taken along the line VI—VI in FIG. 3.

The upper half body is disposed at both corners on the rear potion thereof with mounting surfaces 32, 32 projecting upward and further formed at both side ends on the rear wall with recesses 34, 34 for fitting therein a fixing plate 67 projecting downward from the rear case 61 of the TV cabinet and to be connectable with each other by means of the fastening member, as shown in FIG. 6.

The cord 41 of the speaker driver 4 disposed on the lower half body 2 is drawn out through the hole 36 formed in the upper half body 3. Then, the side wall 20 of the lower half body and the side wall 30 of the upper half body are fitted to bond with each other at the respective end surfaces. The tube body 1 is thus integrally formed to complete the manufacture of the speaker.

Figure 2:
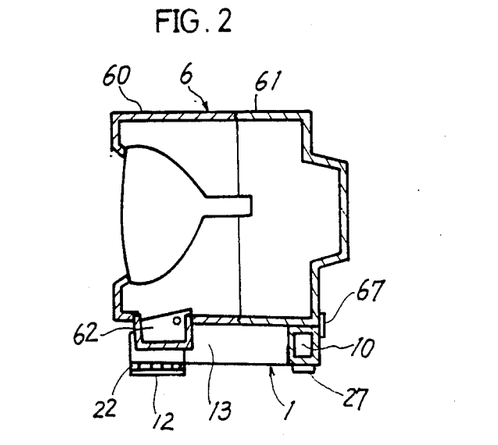
FIG. 2 is a view in section taken along the line II—II in FIG. 1.

In the speaker system according to the present invention, the front case 60 of the TV cabinet 6 is placed over the front mounting surfaces 31, 31 of the upper half body 3 and is fixed to the upper half body with bolts inserted in the holes 33. The rear case 61 is placed over the rear mounting surfaces 32, 32 and is further attached to the upper half body by fitting the fixing plate 67, 67 in the recess 34, 34 and fixing with each other. Thus, the TV cabinet 6 and the speaker are assembled integrally. The assembly of this combination makes it possible to accommodate the controller 62 of the TV cabinet in the front space 13 of the speaker system, as shown in FIG. 2, thus enabling the entire design to provide a compact and small sized structure.

With the foregoing speaker system, the tube body 1 is brought at its inner space into resonance with the vibration of heavy low sounds radiated from the speaker driver 4, and thereby to cause the drone cone 5 at the other arm end to vibrate, with the result that the sounds are emanated outward from each of the sound radiation outlets 24 formed at the forward ends of the arms.

The present invention is not limited to the foregoing description and illustration in the drawings. For example, a second speaker driver might be disposed instead of the drone cone 5, so that the vibrating sound derived from the second speaker driver can be driven in phase with that from the first speaker driver 4. In this case, the speaker operates in such a manner as similar to the closed type speaker with a space having the half volume of the tube body 1.

It is to be understood that various changes and modification can be made by those skilled in the art without departing from the scope of the invention as defined in the claims, and that such modification will be included within the scope of the claims.

What is claimed is:

1. A speaker system having a low frequency speaker driver and formed with sound radiation outlets having direction to be oriented forward, the speaker system comprising:
    a tube body having a tubular straight portion and a pair of tubular arms, each of the arms attached to the straight portion integrally therewith and bent at the end portion of the straight portion and extending in the forward direction to provide therebetween a wide space opening for accommodation, each arm further having sound radiation outlets formed in its forward end portion;
    a speaker driver attached to the forward end of one of the arms and communicating with the other of the sound radiation outlets; and
    a drone cone attached to the forward end of the other of the arms and communicating with the other of the sound radiation outlets.

2. The speaker system as defined in claim 1 wherein the speaker driver and the drone cone are disposed in a vertical direction at the forward ends of the arms, and the sound radiation outlets are formed at the forward ends of the arms and surrounding the circumference of the speaker driver or the drone cone.

3. The speaker system as defined in claim 1 wherein the tube body has a structure dividable into a lower section and an upper section, and comprises a lower half body and an upper half body, the lower and upper half bodies being fitted with each other, and the lower half body being provided at the forward ends of the arms with the sound radiation outlets, the speaker driver and the drone cone.

4. The speaker system as defined in claim 1 wherein a cabinet for TV receiver is further provided on the upper surface of the tube body and a controller of the TV receiver is installed in the accommodation space of the tube body.

5. A speaker system having a low frequency speaker driver and formed with sound radiation outlets having direction to be oriented forward, the speaker system comprising:
    a tube body having a tubular straight portion and a pair of tubular arms, each of the arms attached to the straight portion integrally therewith and bent at the end portion of the straight portion and extending in the forward direction to provide therebetween a wide space opening for accommodation, each arm further having sound radiation outlets formed in its forward end portion;
    a first speaker driver attached to the forward end of one of the arms and communicating with one of the sound radiation outlets; and
    a second speaker driver attached to the forward end of the other of the arms and communicating with the other of the sound radiation outlets,
    the second speaker driver being adapted to be driven in phase with the first speaker driver.

* * * * *